United States Patent [19]

Russell

[11] 4,453,788
[45] Jun. 12, 1984

[54] PORTABLE DESK

[76] Inventor: Jack M. Russell, 1707 Reynolds Rd., Lot 19, Lakeland, Fla. 33801

[21] Appl. No.: 283,947

[22] Filed: Jul. 16, 1981

[51] Int. Cl.³ .................... A47B 23/00; B60R 7/08
[52] U.S. Cl. ............................ 312/231; 312/233; 224/273; 224/276; 248/447.1; 108/44
[58] Field of Search ................ 312/231, 233, 242; 108/44; 248/441 B; 224/273, 276

[56] References Cited

U.S. PATENT DOCUMENTS

| | | | |
|---|---|---|---|
| 275,882 | 4/1883 | Brownell | 312/231 |
| 905,836 | 12/1908 | Bowman | 312/233 |
| 1,347,222 | 7/1920 | Hufschmidt | 224/276 |
| 1,369,439 | 2/1921 | Johnson | 312/231 |
| 1,717,433 | 6/1929 | Bragg et al. | 248/441 B |
| 1,883,714 | 10/1932 | Gray | 312/233 |
| 1,977,507 | 10/1934 | Edwards | 224/276 |
| 1,991,029 | 2/1935 | Pinney | 248/441 B |
| 2,299,025 | 10/1942 | McGinley | 108/44 |
| 2,680,325 | 6/1954 | Berman | 312/231 |
| 2,795,473 | 6/1957 | Smith | 312/231 |
| 3,085,839 | 4/1963 | Gallagher | 312/233 |
| 3,643,606 | 2/1972 | Vise | 108/44 |
| 3,952,988 | 4/1976 | Easterly | 248/441 B |
| 4,166,559 | 9/1979 | Richardson | 108/44 |
| 4,244,632 | 1/1981 | Molinari | 312/233 |

FOREIGN PATENT DOCUMENTS 552891  2/1958  Canada ................... 108/44

*Primary Examiner*—Victor N. Sakran
*Attorney, Agent, or Firm*—Kokjer, Kircher, Bradley, Wharton, Bowman & Johnson

[57] ABSTRACT

A portable writing desk is the subject of the present invention. The desk is particularly designed for use on a vehicle steering wheel. A flat surface is provided for resting against the steering wheel and a plurality of hooks extend from the surface for engagement over the rim of the wheel. A writing surface is disposed in spaced relationship to the flat surface and is inclined in the same direction as the steering wheel. The writing surface is hinged so as to provide access to an inner cavity which holds papers, writing instruments, etc. The portable writing desk may also be used in the lap of a person or on a flat planar surface and, in this manner, provides for an incline writing surface that is comfortable and convenient.

6 Claims, 4 Drawing Figures

U.S. Patent  Jun. 12, 1984  4,453,788
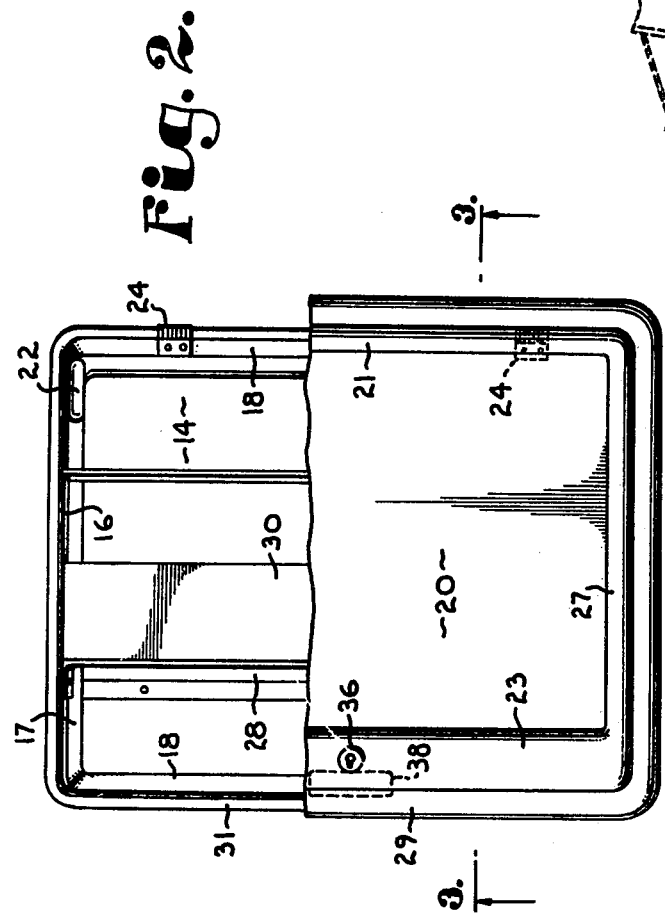
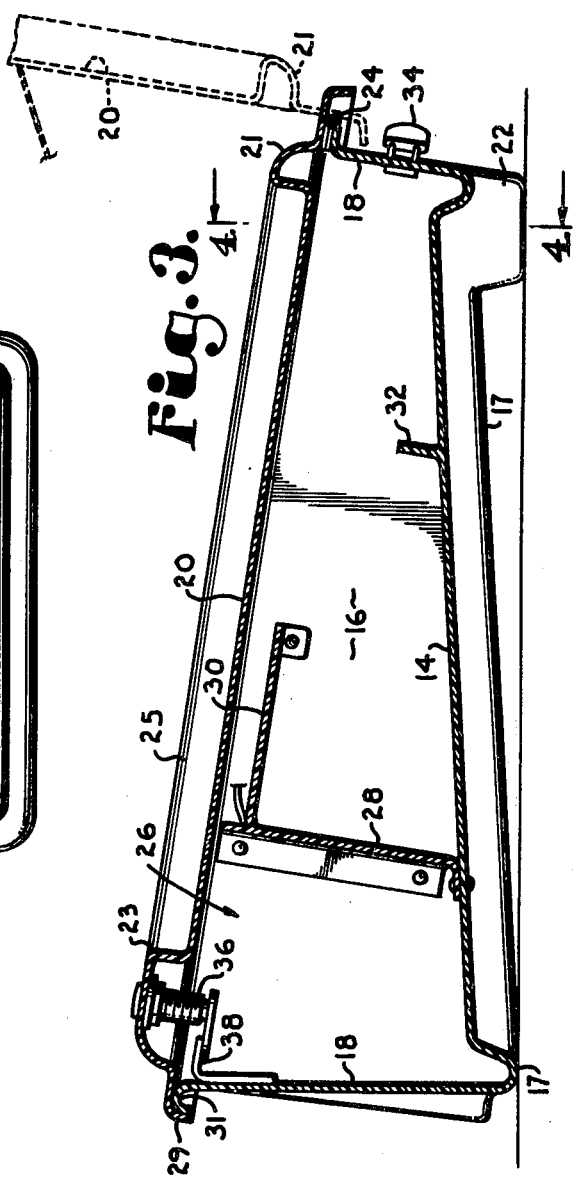
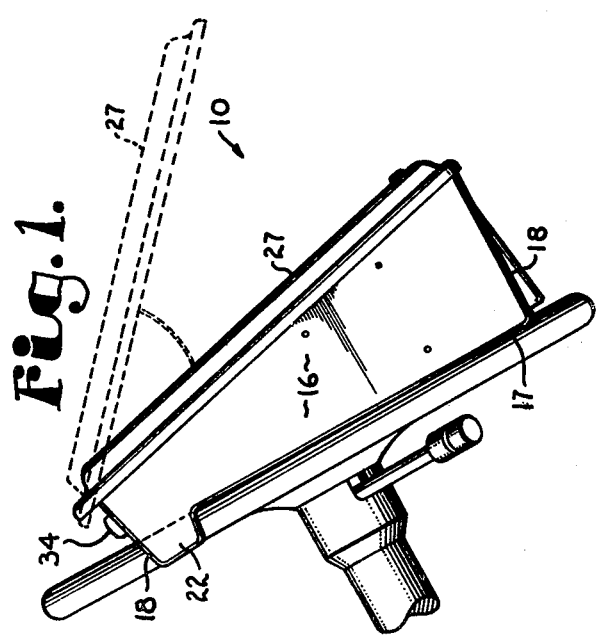
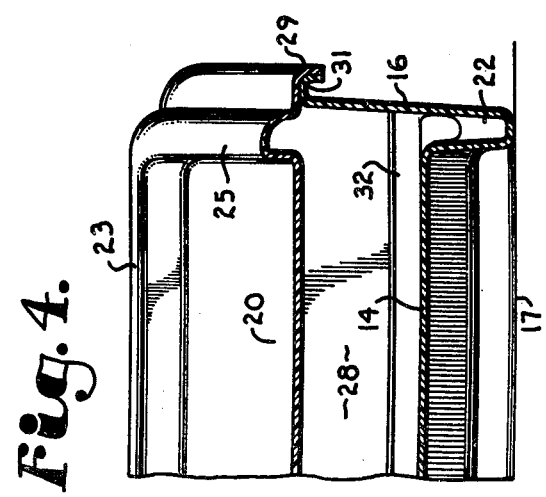

PORTABLE DESK

This invention relates generally to writing tables and, more particularly, to a portable desk especially designed for use in conjunction with a vehicle steering wheel.

Various types of writing surfaces of a portable nature have been provided for students, salesmen, taxi drivers, truck drivers and others who have the need to write away from a fixed desk and in some instances write in a vehicle. The devices previously known, of which I am aware, have largely taken the form of clip boards or other flat pieces of board which in some instances include provision for holding a piece of paper and/or a writing instrument. As far as I am aware, no one has heretofore designed any type of portable desk designed to be supported entirely by the steering wheel leaving both hands of a user free to handle paperwork and perform writing tasks.

It is, therefore, a primary object of the present invention to provide a portable desk for use in conjunction with a vehicle steering wheel.

Another object of the present invention is to provide a portable desk for use with a vehicle steering wheel which portable desk provides an inclined writing surface and also serves as a carrying case for papers, maps, calculators and other items.

An important aim of my invention is to provide a portable desk for use with a vehicle steering wheel which engages the wheel and is supported by it leaving both hands of a user of the device free for other tasks.

As a corollary to the above aim and objects, a principal objective of the invention herein described and claimed is to provide a portable desk meeting the criteria of the objects and aim above which may also be used to provide a writing tablet on a person's lap or on a flat horizontal surface.

Still another important purpose of my invention is to provide a compartment for maps, papers, and other items which compartment is constructed on the order of a file cabinet, including divider partitions for facilitating organization of the objects placed therein.

Other objects of the invention will be made clear or become apparent from the following description and claims when read in light of the accompanying drawing wherein:

FIG. 1 is a side elevational view showing the portable desk of the present invention in place on a steering wheel;

FIG. 2 is a top plan view with portions broken away to illustrate the interior construction;

FIG. 3 is an enlarged vertical cross-section taken along line 3—3 of FIG. 2; and FIG. 4 is a fragmentary vertical cross-section taken along line 4—4 of FIG. 3.

Referring initially to FIGS. 1 and 3, the portable desk of the present invention is designated generally by the numeral 10 and is designed for use with a vehicle steering wheel 12. Desk 10 comprises a flat base surface 14, side walls 16 and 18 and a writing surface 20 (FIG. 2). Writing surface 20 is inclined relative to the horizontal in the same direction as steering wheel 12. Two parallel retainer ledges 21 and 23 are disposed at the top and bottom of writing surface 20 as the latter is disposed on steering wheel 12. Retainer ledges 21 and 23 merge into parallel side ledges 25 and 27 so as to place surface 20 in recessed relationship to the ledges. All of the ledges 21, 23, 25 and 27 merge into a lip 29 that is complemental with a rolled edge 31 of sidewalls 16 and 18.

It is to be noted that side walls 16 and 18 project outwardly from base surface 14 (see FIG. 4) a distance approximately equal to the thickness of a steering wheel to present a bottom support 17. Projecting outwardly away from surface 14 are hook members 22 which are designed to engage steering wheel 12 in the manner illustrated. As best illustrated in FIG. 1, hooks 22 project outwardly from side walls 16 a distance approximately equal to the thickness of steering wheel 12 so that, when the hooks engage the wheel, uppermost sidewalls 16 and 18 will likewise engage the wheel along their bottom side edges.

Writing surface 20 is coupled with one of sidewalls 18 by hinges 24 and can be pivoted to an open position as illustrated in FIGS. 1 and 3.

Sidewalls 16 and 18 along with base surface 14 and writing surface 20 present an inner compartment 26. Compartment 26 includes a divider partition 28 and a shelf tray 30. Another divider 32 provides for further segmentation of the compartment. A handle 34 is coupled with one sidewall 18 to allow the device to be carried as a briefcase. A lock 36 in ledge 23 is engageable with a lock plate 38 mounted on one wall 18.

The device is used by placing hooks 22 over wheel 12 in the manner illustrated in FIGS. 1. The device is self-aligning and will completely support itself on the wheel without the need for a user to hold it with one or both hands. As previously indicated, sidewalls 16 and 18 will rest against wheel 12 to steady the device while hooks 22 prevent downward movement. Writing surface 20 is disposed at a slightly less steep angle of inclination than wheel 12 so as to provide a comfortable area for an operator to work. It is to be noted that hinges 24 are placed at the upper end of the writing surface so that a user may have access to the interior compartment even while the device is in place on the steering wheel.

Whenever it is desired to remove the portable desk, it is simply lifted off of the wheel without the need to unlock any auxiliary fasteners. The device may be carried as an attache case by handle 34 and, because of the construction of compartment 26, papers, calculators, writing instruments and similar articles placed within the compartment will stay neatly in place.

If it is desired to use the device as a lap desk or on a horizontal surface such as is commonly encountered in a restaurant or motel room, the device is placed with the inclined writing surface 20 inclined away from the user so as to provide a convenient and comfortable area where written work may be conducted.

The steering wheel 12 illustrated in the drawings is indicative of the size wheel encountered on most large trucks and tractor trailers. With smaller wheels of the type normally encountered in automobiles, hooks 22 may be spaced too far apart to properly grasp the wheel. The device may still be utilized, however, by simply placing the wheel inside of the bottom support 17.

The device is particularly designed for use by truck drivers but will also find application by taxi drivers, salesmen, students and others who frequently need to write in a vehicle. It is to be emphasized, of course, that the device is not intended to be used while the vehicle is in operation, but only when it is in a parked position with the emergency brake set.

I claim:

1. A portable writing desk for use in both a vehicle having a steering wheel inclined relative to the horizontal, and on a horizontal surface, said writing desk comprising:

means presenting a flat surface;

first and second hook means coupled with said surface and projecting away from it for engagement with said steering wheel, each of said hook means being characterized by a closed configuration of generally polygonal cross section, a flat bottom, and an absence of any open protrusions, so as to present a foot support for said flat surface presenting means when the latter is placed on said horizontal surface;

a plurality of sidewalls coupled with said flat surface presenting means and projecting upwardly therefrom, said sidewalls increasing in height as they extend away from the end of said surface presenting means where said hook means are located;

means presenting a writing surface and being hingedly coupled with one of said sidewalls at the same side of said surface presenting means as the side where said hook means are located, whereby when said hook means engage said steering wheel said writing surface is inclined toward said hook means and when said hook means are placed on a horizontal surface said writing surface is inclined away from said hook means.

2. A device as set forth in claim 1, wherein each of said hook means is disposed entirely beneath said flat surface presenting means and in alignment with said sidewalls.

3. A device as set forth in claim 1, wherein is included means presenting ledges extending upwardly from said writing surface means at both the top and bottom thereof as said desk is disposed on said steering wheel.

4. A device as set forth in claim 3, wherein is included a tray member disposed inside of said compartment.

5. A device as set forth in claim 4, wherein is included divider means for partioning said compartment.

6. A device as set forth in claim 5, wherein is included handle means disposed outside of said compartment for carrying said device.

* * * * *